US012735107B2

(12) United States Patent
Oniwa et al.

(10) Patent No.: US 12,735,107 B2
(45) Date of Patent: Sep. 15, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yoshihiro Oniwa, Tokyo (JP); Takuya Niioka, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 58 days.

(21) Appl. No.: 18/894,406

(22) Filed: Sep. 24, 2024

(65) Prior Publication Data

US 2025/0108860 A1 Apr. 3, 2025

(30) Foreign Application Priority Data

Sep. 29, 2023 (JP) ................................ 2023-170086

(51) Int. Cl.
*B62D 15/02* (2006.01)
*B60Q 9/00* (2006.01)
(Continued)

(52) U.S. Cl.
CPC ......... *B62D 15/0265* (2013.01); *B60Q 9/008* (2013.01); *B60W 30/09* (2013.01);
(Continued)

(58) Field of Classification Search
CPC ........... B60K 28/00–165; B60Q 9/008; B60W 30/09; B60W 30/12; B60W 30/16–17;
(Continued)

(56) References Cited

U.S. PATENT DOCUMENTS 10,953,895 B2 * 3/2021 Kozlowski ............ B60W 40/08

FOREIGN PATENT DOCUMENTS

CN 115214646 10/2022
EP 2620314 A1 * 7/2013 ........... B60K 28/066
(Continued)

OTHER PUBLICATIONS

Bogner, EP 2 620 314, machine translation. (Year: 2013).*
Japanese Office Action for Japanese Patent Application No. 2023-170086 mailed Nov. 26, 2024.

*Primary Examiner* — Mark L. Greene
(74) *Attorney, Agent, or Firm* — Amin, Turocy & Watson, LLP

(57) ABSTRACT

A vehicle control device of an embodiment includes a recognizer that recognizes a surrounding situation of a vehicle; a driving state detector that detects a driving state of a driver; a controller that executes, when an obstacle is present in front of the vehicle and the driver is in a distracted driving state, driving control suitable for the obstacle; and a notifier that issues a notification when the driving control is executed. The notifier includes a first notification which is notified at the time of execution of first driving control including steering control, and a second notification which is notified at the time of execution of second driving control executed in a state in which the vehicle has approached further toward the obstacle from in the first driving control. The second notification is issued when a particular driving support function is operated within a predetermined time from the first notification.

14 Claims, 10 Drawing Sheets

(51) Int. Cl.
*B60W 30/09* (2012.01)
*B60W 40/08* (2012.01)
*B60W 50/14* (2020.01)
*B60W 50/16* (2020.01)

(52) U.S. Cl.
CPC ............... *B60W 2040/0818* (2013.01); *B60W 2050/143* (2013.01); *B60W 2050/146* (2013.01); *B60W 50/16* (2013.01); *B60W 2540/22* (2013.01); *B60W 2540/229* (2020.02)

(58) Field of Classification Search
CPC ............... B60W 30/182; B60W 50/16; B60W 2040/0818–0863; B60W 2050/143; B60W 2050/146; B60W 2540/22; B60W 2540/229; B60W 2540/26; B62D 15/0265; G05D 1/0061; G05D 1/0088; G05D 1/021; G05D 1/0214; G05D 1/0221; G05D 1/0223
See application file for complete search history.

(56) References Cited

FOREIGN PATENT DOCUMENTS

| | | |
|---|---|---|
| JP | 2001-022444 | 1/2001 |
| JP | 2008-179251 | 8/2008 |
| JP | 2019-111927 | 7/2019 |
| JP | 2019-151185 | 9/2019 |

* cited by examiner

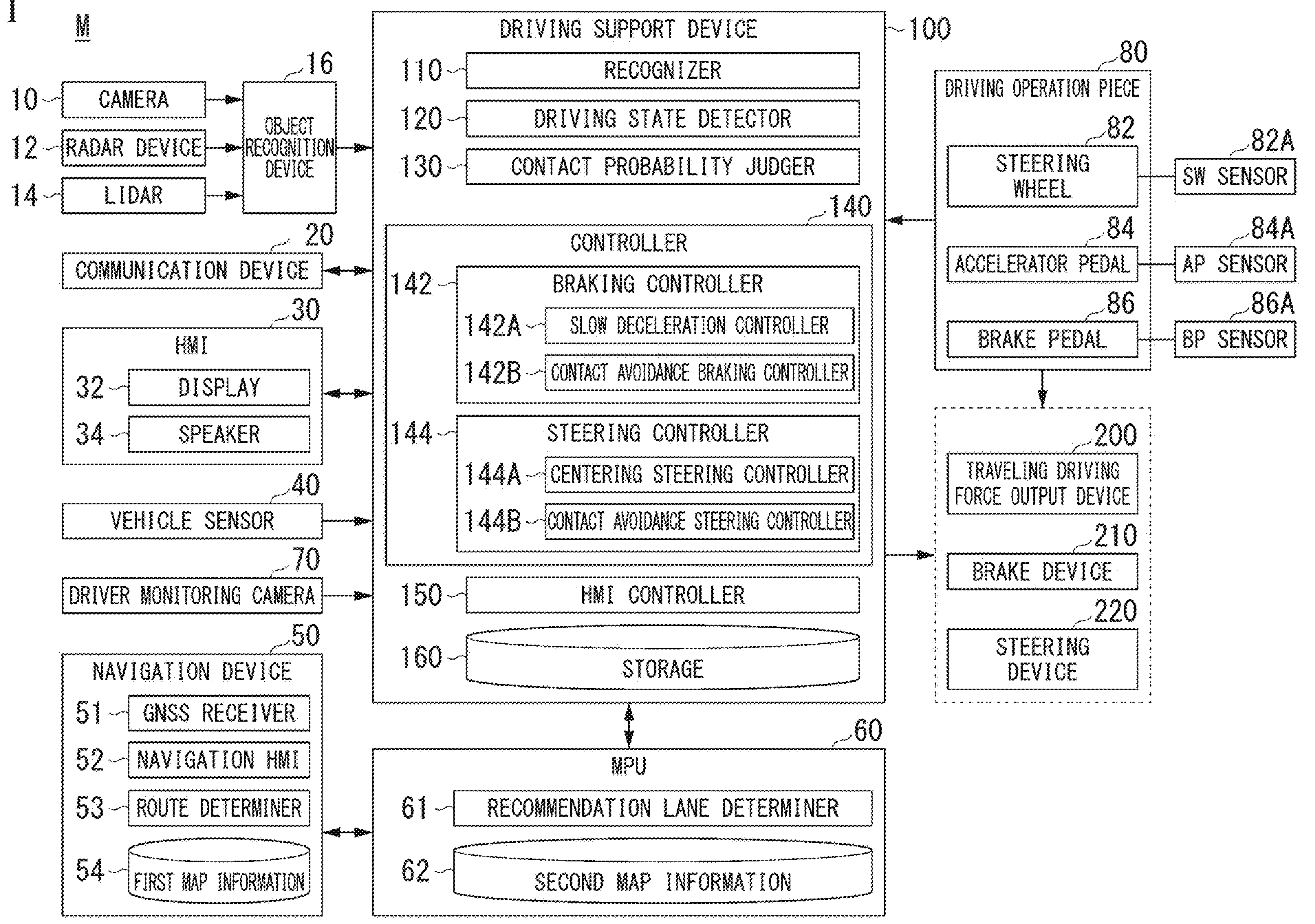
FIG. 1
M
10 CAMERA
12 RADAR DEVICE
14 LIDAR
16 OBJECT RECOGNITION DEVICE
20 COMMUNICATION DEVICE
30 HMI
32 DISPLAY
34 SPEAKER
40 VEHICLE SENSOR
70 DRIVER MONITORING CAMERA
50 NAVIGATION DEVICE
51 GNSS RECEIVER
52 NAVIGATION HMI
53 ROUTE DETERMINER
54 FIRST MAP INFORMATION
100 DRIVING SUPPORT DEVICE
110 RECOGNIZER
120 DRIVING STATE DETECTOR
130 CONTACT PROBABILITY JUDGER
140 CONTROLLER
142 BRAKING CONTROLLER
142A SLOW DECELERATION CONTROLLER
142B CONTACT AVOIDANCE BRAKING CONTROLLER
144 STEERING CONTROLLER
144A CENTERING STEERING CONTROLLER
144B CONTACT AVOIDANCE STEERING CONTROLLER
150 HMI CONTROLLER
160 STORAGE
60 MPU
61 RECOMMENDATION LANE DETERMINER
62 SECOND MAP INFORMATION
80 DRIVING OPERATION PIECE
82 STEERING WHEEL
84 ACCELERATOR PEDAL
86 BRAKE PEDAL
82A SW SENSOR
84A AP SENSOR
86A BP SENSOR
200 TRAVELING DRIVING FORCE OUTPUT DEVICE
210 BRAKE DEVICE
220 STEERING DEVICE

FIG. 2

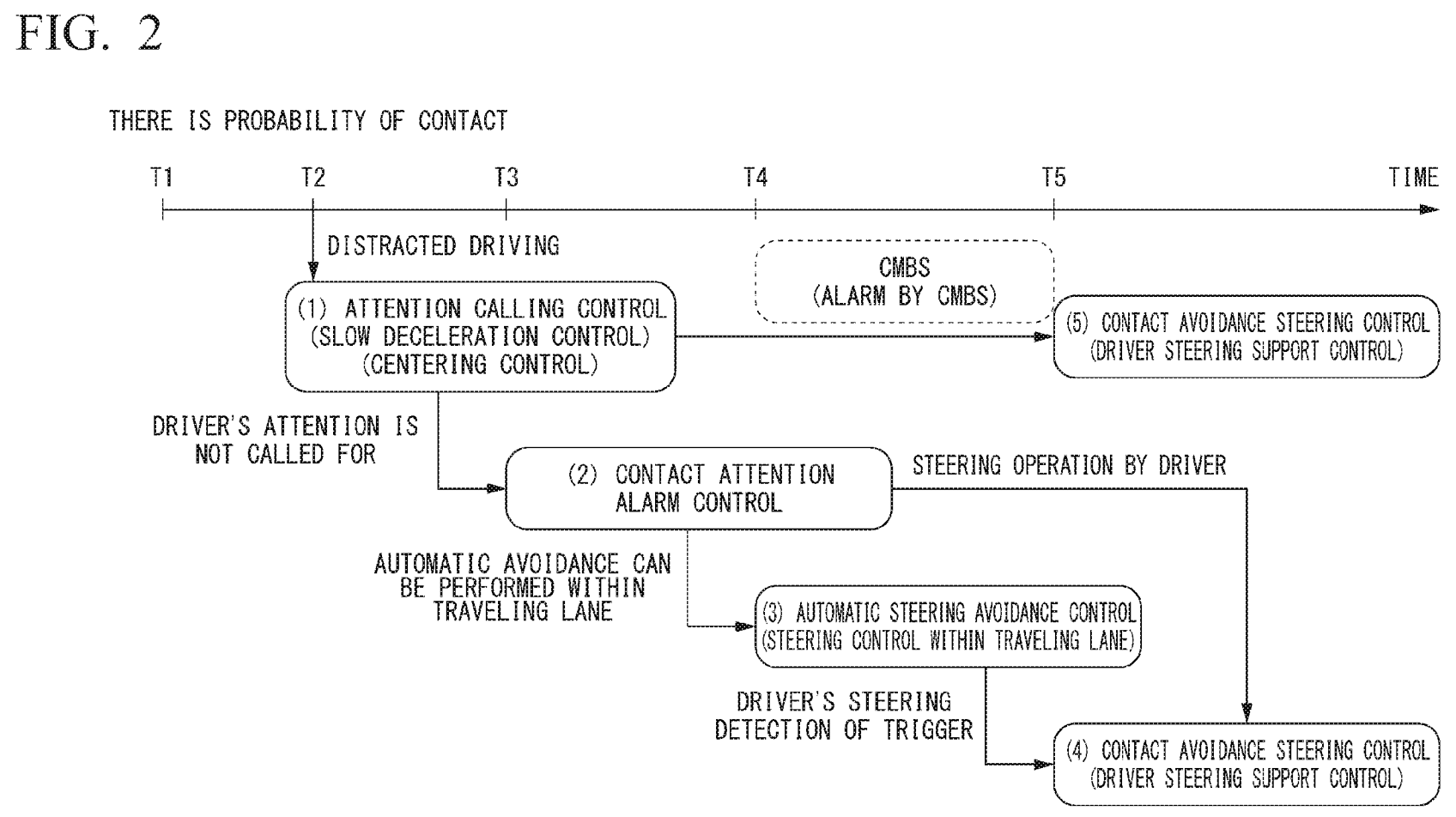

THERE IS PROBABILITY OF CONTACT

T1 T2 T3 T4 T5 TIME

DISTRACTED DRIVING (1) ATTENTION CALLING CONTROL
(SLOW DECELERATION CONTROL)
(CENTERING CONTROL)

DRIVER'S ATTENTION IS NOT CALLED FOR (2) CONTACT ATTENTION ALARM CONTROL

CMBS
(ALARM BY CMBS)

(5) CONTACT AVOIDANCE STEERING CONTROL
(DRIVER STEERING SUPPORT CONTROL)

STEERING OPERATION BY DRIVER

AUTOMATIC AVOIDANCE CAN BE PERFORMED WITHIN TRAVELING LANE (3) AUTOMATIC STEERING AVOIDANCE CONTROL
(STEERING CONTROL WITHIN TRAVELING LANE)

DRIVER'S STEERING DETECTION OF TRIGGER (4) CONTACT AVOIDANCE STEERING CONTROL
(DRIVER STEERING SUPPORT CONTROL)

FIG. 7

| OPERATION PHASE | CONTROL | OPERATION STARTING SPEED |
|---|---|---|
| AUTOMATIC STEERING AVOIDANCE, CONTACT AVOIDANCE STEERING | CONTACT AVOIDANCE STEERING CONTROL | 40 [km/h] OR HIGHER |
| ATTENTION CALLING, CONTACT ATTENTION ALARM | CENTERING STEERING CONTROL | 30 [km/h] OR HIGHER |
| | SLOW DECELERATION CONTROL (WITH AP OPERATION) | 30 [km/h] OR HIGHER |
| | SLOW DECELERATION CONTROL (WITH NO AP OPERATION) | 5 [km/h] OR HIGHER |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-170086, filed Sep. 29, 2023, the content of which is incorporated herein by reference.

BACKGROUND

Field of the Invention

The present invention relates to a vehicle control device, a vehicle control method, and a storage medium.

Description of Related Art

In recent years, efforts to provide access to sustainable transportation systems taking vulnerable people among traffic participants into account have become active. In order to realize this, the efforts are focused on research and development for further improvement in traffic safety and convenience through research and development related to preventive safety technology. In connection with this, recently, a technology in which whether there will be a collision between a following vehicle and an obstacle when a host vehicle is caused to avoid the obstacle through any one avoidance operation of lane change and steering is estimated and the avoidance operation is determined on the basis of the estimated result of occurrence of a collision has been disclosed (for example, Japanese Unexamined Patent Application, First Publication No. 2019-151185).

SUMMARY

Incidentally, in preventive safety technology, notification control for calling attention of an occupant of a vehicle to the surroundings has not been taken into account at a stage before control for avoiding contact between the vehicle and a target is performed. For this reason, in the related art, a problem has been that it may not be possible to issue an appropriate notification to an occupant in accordance with the situation of a vehicle.

In order to resolve the foregoing problems, an object of this application is to provide a vehicle control device, a vehicle control method, and a storage medium, in which it is possible to issue a more appropriate notification to an occupant in accordance with the situation of a vehicle. Further, this will ultimately contribute to development of sustainable transportation systems.

A vehicle control device, a vehicle control method, and a storage medium according to this invention employ the following constitutions.

(1): A vehicle control device according to an aspect of this invention is a vehicle control device including a recognizer that recognizes a surrounding situation of a host vehicle; a driving state detector that detects a driving state of a driver of the host vehicle; a controller that executes, when an obstacle is present in front of the host vehicle and the driver is in a distracted driving state, driving control suitable for the obstacle on the basis of recognition results of the recognizer; and a notifier that issues a notification to the driver when the driving control is executed by the controller. The notifier includes a first notification which is notified at the time of execution of first driving control including steering control, and a second notification which is notified at the time of execution of second driving control executed in a state in which the host vehicle has approached further toward the obstacle from in the first driving control. The second notification is issued when a particular driving support function is operated within a predetermined time from the first notification.

(2): According to the aspect of the foregoing (1), the first notification is a notification issued by displaying an image. The second notification is a notification issued by displaying an image and outputting sound.

(3): According to the aspect of the foregoing (1), the particular driving support function includes steering control for curbing road departure of the host vehicle.

(4): According to the aspect of the foregoing (1), the particular driving support function includes control for stopping the host vehicle at a predetermined position when it is detected that the driver is not in a state of being capable of driving the host vehicle.

(5): According to the aspect of the foregoing (1), the particular driving support function includes steering control for causing the driver, when it is judged that an obstacle is present in front of the host vehicle and it is judged that the driver is distracted, to recognize the presence of the obstacle from recognition results of the recognizer.

(6): According to the aspect of the foregoing (5), the first driving control is first steering control for calling attention of a driver of the host vehicle to the obstacle, and the particular driving support function is second steering control for the attention calling.

(7): According to the aspect of the foregoing (1), the controller does not perform the first driving control and performs deceleration control for decelerating the host vehicle when a traveling lane of the host vehicle has not been able to be recognized by the recognizer. The notifier issues a notification for the deceleration control.

(8): According to the aspect of the foregoing (1), the notifier does not issue the second notification even when the particular driving support function is operated within a predetermined time from the first driving control when override control for switching to manual driving through a predetermined driving operation of the driver is executed at the time of executing the first driving control.

(9): According to the aspect of the foregoing (8), the predetermined driving operation of the driver is a steering operation of the host vehicle.

(10): According to the aspect of the foregoing (8), the notifier does not issue the second notification even when the particular driving support function is operated within a predetermined time from the first driving control on condition that the driver is gripping a steering wheel when the override control is executed through an accelerator operation or a brake operation of the driver.

(11): According to the aspect of the foregoing (1), the controller does not execute driving control based on the particular driving support function when the second notification is issued by the notifier within a predetermined time from the first notification.

(12): According to the aspect of the foregoing (1), the controller does not execute driving control for calling attention of a driver of the host vehicle to the obstacle until a time set in advance has elapsed when the second notification is issued by the notifier within a predetermined time from the first notification.

(13): According to the aspect of the foregoing (1), the notifier lengthens a notification time on the basis of the number of times of issuing the second notification within a predetermined time.

(14): A vehicle control method according to another aspect of the present invention is a vehicle control method in which a computer recognizes a surrounding situation of a host vehicle; detects a driving state of a driver of the host vehicle; executes, when an obstacle is present in front of the host vehicle and the driver is in a distracted driving state, driving control suitable for the obstacle on the basis of recognition results of the surrounding situation; and issues a notification to the driver when the driving control is executed. The notification includes a first notification which is notified at the time of execution of first driving control including steering control, and a second notification which is notified at the time of execution of second driving control executed in a state in which the host vehicle has approached further toward the obstacle from in the first driving control. The second notification is issued when a particular driving support function is operated within a predetermined time from the first notification.

(15): A storage medium according to another aspect of the present invention is a computer readable non-transitory storage medium which stores a program causing a computer to recognize a surrounding situation of a host vehicle; to detect a driving state of a driver of the host vehicle; to execute, when an obstacle is present in front of the host vehicle and the driver is in a distracted driving state, driving control suitable for the obstacle on the basis of recognition results of the surrounding situation; and to issue a notification to the driver when the driving control is executed. The notification includes a first notification which is notified at the time of execution of first driving control including steering control, and a second notification which is notified at the time of execution of second driving control executed in a state in which the host vehicle has approached further toward the obstacle from in the first driving control. The second notification is issued when a particular driving support function is operated within a predetermined time from the first notification.

According to the aspects of the foregoing (1) to (15), it is possible to issue a more appropriate notification to an occupant in accordance with the situation of a vehicle.

BRIEF DESCRIPTION OF THE DRAWINGS

FIG. 1 is a view of a constitution of a host vehicle M in which a vehicle control device of an embodiment is mounted.

FIG. 2 is an explanatory view of details of vehicle control related to contact avoidance.

FIG. 7 is an explanatory view of speed conditions of the host vehicle for starting control for each operation phase.

DESCRIPTION OF EMBODIMENT

Figure 3:
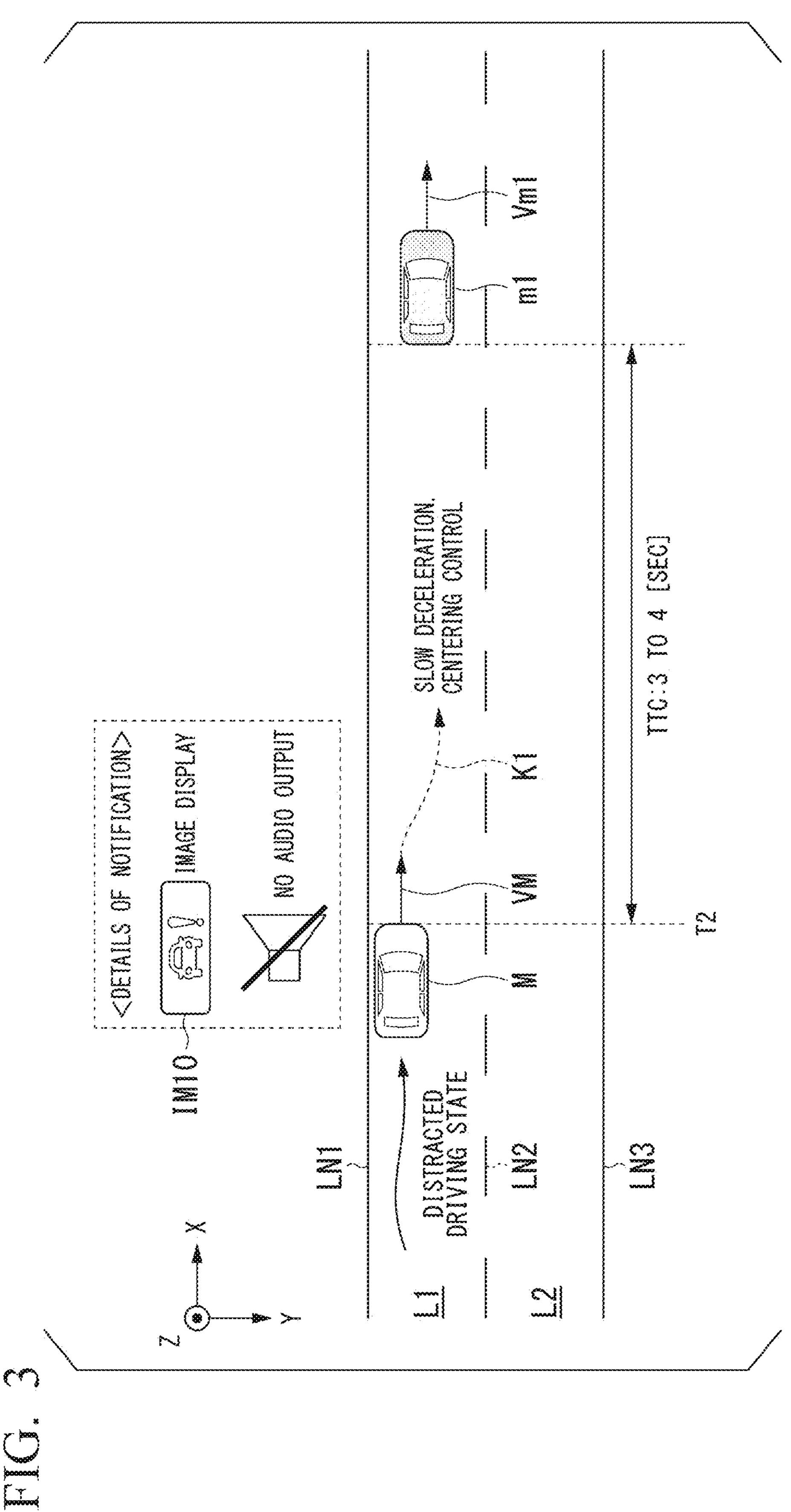
FIG. 3 is an explanatory view of details of attention calling control.

Hereinafter, with reference to the drawings, an embodiment of a vehicle control device, a vehicle control method, and a storage medium according to the present invention will be described.

[Overall Constitution]

FIG. 1 is a view of a constitution of a host vehicle M in which a vehicle control device of an embodiment is mounted. For example, the host vehicle M is a vehicle having two wheels, three wheels, four wheels, or the like, and a drive source thereof is an internal-combustion engine such as a diesel engine or a gasoline engine, an electric motor, or a combination of these. An electric motor is operated using generated power by a generator connected to an internal-combustion engine, or discharge power of a secondary battery or a fuel cell.

In the host vehicle M, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitoring camera 70, a driving operation piece 80, a driving support device 100, a traveling driving force output device 200, a brake device 210, and a steering device 220 are mounted. These devices and instruments are connected to each other through a multiplex communication line such as a controller area network (CAN) communication line, a serial communication line, a wireless communication network, or the like. The constituents shown in FIG. 1 are merely an example. Some of the constituents may be omitted, and other constituents may further be added thereto. The driving support device 100 is an example of "a vehicle control device".

For example, the camera 10 is a digital camera utilizing a solid-state image capturing element such as a charge coupled device (CCD) or a complementary metal oxide semiconductor (CMOS). The camera 10 is attached to an arbitrary location in the host vehicle M. For example, when images on the side in front are captured, the camera 10 is attached to an upper part of a front windshield, a rear surface of a rearview mirror, or the like. For example, the camera 10 captures images around the host vehicle M periodically and repeatedly. The camera 10 may be a stereo camera.

The radar device 12 radiates radio waves such as millimeter waves around the host vehicle M and detects at least the position (distance and azimuth) of an object by detecting radio waves (reflected waves) reflected by the object. The radar device 12 is attached to an arbitrary location in the host vehicle M. The radar device 12 may detect the position and the speed of an object by a frequency modulated continuous wave (FM-CW) method.

The LIDAR 14 emits light (or electromagnetic waves having wavelengths close to that of light) around the host vehicle M and measures scattered light. The LIDAR 14 detects the distance to a target on the basis of the time from light emission to light reception. For example, emitted light is pulsed laser light. The LIDAR 14 is attached to an arbitrary location in the host vehicle M.

The object recognition device 16 recognizes the position, the kind, the speed, and the like of an object by performing sensor fusion processing with respect to detection results of some or all of the camera 10, the radar device 12, and the LIDAR 14. The object recognition device 16 outputs recognition results to the driving support device 100. The object recognition device 16 may output the detection results of the camera 10, the radar device 12, and the LIDAR 14 to the driving support device 100 without any change. The object recognition device 16 may be omitted from the host vehicle M. Some or all of the camera 10, the radar device 12, the LIDAR 14, and the object recognition device 16 are examples of "an external detection device".

For example, the communication device 20 communicates with different vehicles present around the host vehicle M utilizing a cellular network, a Wi-Fi network, Bluetooth (registered trademark), dedicated short range communication (DSRC), or the like or communicates with various server devices via a wireless base station.

The HMI 30 provides various information to an occupant of the host vehicle M and receives an input operation of the occupant. For example, the HMI 30 includes a display 32 and a speaker 34. For example, the display 32 is a liquid crystal display (LCD), an electroluminescence (EL) display device, or the like. For example, the display 32 may be a multi-information display (MID) provided in a central part of an instrument panel of the host vehicle M, may be a meter display provided in a part of the instrument panel in front of a driver's seat, or may be a head-up display (HUD). The display 32 may be provided in a plurality of locations. For example, the display 32 displays various information in the host vehicle M, such as a speedometer showing the traveling speed of the host vehicle M, a tachometer showing the rotation frequency (rotational speed) of the internal-combustion engine provided in the host vehicle M, information (images and video images) related to various driving support executed by the host vehicle M. The display 32 may be constituted integrally with an input as a touch panel. The speaker 34 outputs predetermined audio (for example, an alarm or the like). In addition to (or instead of) the display 32 and the speaker 34, the HMI 30 may be a microphone, a buzzer, a vibration generation device (vibrator), a touch panel, a switch, a key, or the like.

The vehicle sensor 40 includes a vehicle speed sensor for detecting a speed of the host vehicle M, an acceleration sensor for detecting an acceleration, a yaw rate sensor for detecting a yaw rate (for example, a rotational angular velocity around a vertical axis passing through the center of gravity of the host vehicle M), an azimuth sensor for detecting a direction of the host vehicle M, and the like. The vehicle sensor 40 may be provided with a position sensor for detecting a position of the host vehicle M. For example, the position sensor is a sensor for acquiring positional information (information of longitude and latitude) from a global positioning system (GPS) device. The position sensor may be a sensor for acquiring positional information using a global navigation satellite system (GNSS) receiver 51 of the navigation device 50.

For example, the navigation device 50 includes the GNSS receiver 51, a navigation HMI 52, and a route determiner 53. In the navigation device 50, first map information 54 is retained in a storage device such as a hard disk drive (HDD) or a flash memory. The GNSS receiver 51 identifies the position of the host vehicle M on the basis of a signal received from a GNSS satellite. The position of the host vehicle M may be identified or complemented by an inertial navigation system (INS) utilizing an output of the vehicle sensor 40. The navigation HMI 52 includes a display device, a speaker, a touch panel, a key, and the like. Some or all of the navigation HMI 52 may be shared by the HMI 30 described above. For example, the route determiner 53 determines a route from the position of the host vehicle M identified by the GNSS receiver 51 (or an arbitrary input position) to a destination input by an occupant (hereinafter, a route on a map) using the navigation HMI 52 with reference to the first map information 54. For example, the first map information 54 is information in which road shapes are expressed by links indicating roads and nodes connected by the links. The first map information 54 may include curvatures of roads, point-of-interest (POI) information, and the like. The route on the map is output to the MPU 60. The navigation device 50 may perform route guide using the navigation HMI 52 on the basis of the route on the map. For example, the navigation device 50 may be realized by a function of a terminal device such as a smartphone or a tablet terminal possessed by an occupant. The navigation device 50 may transmit a current position and a destination to a navigation server via the communication device 20 and acquire a route equivalent to the route on the map from the navigation server.

For example, the MPU 60 includes a recommendation lane determiner 61 and retains second map information 62 in a storage device such as an HDD or a flash memory. The recommendation lane determiner 61 divides the route on the map provided from the navigation device 50 into a plurality of blocks (for example, divides it into blocks of 100 [m] in a vehicle proceeding direction) and determines a recommendation lane for each block with reference to the second map information 62. The recommendation lane determiner 61 determines which lane from the left the vehicle should travel. When a branch point is present in the route on the map, the recommendation lane determiner 61 determines a recommendation lane such that the host vehicle M can travel along a reasonable route to proceed to a branch destination. The second map information 62 is map information that is more accurate than the first map information 54. For example, the second map information 62 includes information of a center of a lane, lane boundary information such as road division lines dividing a lane, or the like. The second map information 62 may include road information, positions of road shoulders, traffic regulation information, address information (address, postal code), facility information, telephone number information, and the like. The second map information 62 may be updated at any time by the communication device 20 through communication with other devices. The first map information 54 and the second map information 62 may be stored in a storage inside the driving support device 100.

For example, the driver monitoring camera 70 is a digital camera utilizing a solid-state image capturing element such as a CCD or a CMOS. The driver monitoring camera 70 is attached to an arbitrary location in the host vehicle M in a position and a direction in which images of the head and the upper body (including positions of the hands) of at least a driver seated in the driver's seat (hereinafter, a driver) of the host vehicle M of occupants riding in the host vehicle M can be captured from the front (in a direction in which images of the face are captured). For example, the driver monitoring camera 70 is attached to an upper part of the display device provided in the central part of the instrument panel of the host vehicle M, for example. The driver monitoring camera 70 outputs images of the inside of a cabin including the driver of the host vehicle M captured from the disposed position to the driving support device 100.

For example, the driving operation piece 80 includes a steering wheel 82, an accelerator pedal 84, a brake pedal 86, an operation switch of a direction indicator, a shift lever, and other operation pieces. A sensor for detecting an amount of operation or whether there is an operation is attached to the driving operation piece 80, and detection results thereof are output to some or all of the driving support device 100, the traveling driving force output device 200, the brake device 210, and the steering device 220.

For example, the steering wheel 82 is provided with a steering wheel sensor (SW sensor) 82A. The SW sensor 82A detects whether or not the driver is gripping the steering wheel 82. The expression "gripping" may also include a state in which the driver is not only grasping the steering wheel 82 with his/her hand but also touching the steering wheel 82 with his/her hand. The SW sensor 82A detects the amount of operation (amount of steering torque, amount of steering) of the steering wheel 82 by the driver. The steering wheel 82 does not necessarily have an annular shape and may be in a form of a deformed steering wheel, a joystick, a button, or the like. In that case, the SW sensor 82A detects the amount of operation corresponding to each form.

The accelerator pedal 84 is attached to an accelerator pedal sensor (AP sensor) 84A. The AP sensor 84A detects the amount of operation (opening degree) of the accelerator pedal 84 changing in accordance with a driver's operation with respect to the accelerator pedal 84. The brake pedal 86 is provided with a brake pedal sensor (BP sensor) 86A. The BP sensor 86A detects the amount of operation (opening degree) of the brake pedal 86 changing in accordance with a driver's operation with respect to the brake pedal 86.

The traveling driving force output device 200 outputs a traveling driving force (torque) for causing the host vehicle M to travel to driving wheels. For example, the traveling driving force output device 200 includes a combination of an internal-combustion engine, an electric motor, a transmission, and the like, and an electronic control unit (ECU) controlling these. The ECU controls the foregoing constituents in accordance with information input from the driving support device 100 or information input from the driving operation piece 80.

For example, the brake device 210 includes a brake caliper, a cylinder transmitting a hydraulic pressure to the brake caliper, an electric motor generating a hydraulic pressure in the cylinder, and an ECU. The ECU controls the electric motor in accordance with information input from the driving support device 100 or information input from the driving operation piece 80 such that a brake torque corresponding to a braking operation is output to each of the wheels. The brake device 210 may include, as a backup, a mechanism for transmitting a hydraulic pressure generated through an operation of the brake pedal included in the driving operation piece 80 to the cylinder via a master cylinder. The brake device 210 is not limited to the constitution described above and may be an electronically controlled hydraulic brake device transmitting a hydraulic pressure of the master cylinder to the cylinder by controlling an actuator in accordance with information input from the driving support device 100.

For example, the steering device 220 includes a steering ECU and an electric motor. For example, the electric motor causes a force to act on a rack-and-pinion mechanism to change the direction of steered wheels. The steering ECU drives the electric motor in accordance with information input from the driving support device 100 or information input from the driving operation piece 80 and changes the direction of the steered wheels.

[Driving Support Device]

For example, the driving support device 100 includes a recognizer 110, a driving state detector 120, a contact probability judger 130, a controller 140, an HMI controller 150, and a storage 160. For example, the recognizer 110, the driving state detector 120, the contact probability judger 130, the controller 140, and the HMI controller 150 are realized by a hardware processor such as a central processing unit (CPU) executing a program (software). Some or all of these constituent elements may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. A program may be stored in a storage device such as an HDD or a flash memory (a storage device including a non-transitory storage medium) of the driving support device 100 in advance or may be stored in an attachable/detachable storage medium such as a DVD or a CD-ROM such that the program is installed in the HDD or the flash memory of the driving support device 100 when the storage medium (non-transitory storage medium) is mounted in a drive device. The HMI 30 and the HMI controller 150 are examples of "a notifier".

For example, setting is performed inside the traveling driving force output device 200, the brake device 210, and the steering device 220 such that instructions from the driving support device 100 to the traveling driving force output device 200, the brake device 210, and the steering device 220 are executed with priority over detection results from the driving operation piece 80. Regarding braking, when a braking force based on the amount of operation of the brake pedal 86 is larger than that in an instruction from the driving support device 100, setting may be performed such that the latter is executed with priority. Regarding a structure for executing an instruction from the driving support device 100 with priority, a communication priority in an in-car local area network (LAN) may be used. Regarding steering, setting may be performed such that it is executed by adding a steering force based on an instruction from the driving support device 100 and a steering force based on the amount of operation of the steering wheel 82 by the driver.

The storage 160 may be realized by the various storage devices described above, a solid state drive (SSD), an electrically erasable programmable read only memory (EEPROM), a read only memory (ROM), a random access memory (RAM), or the like. For example, the storage 160 stores a program, various other information, and the like. The storage 160 may store the map information (the first map information 54 and the second map information 62) described above.

The recognizer 110 recognizes the surrounding situation of the host vehicle M on the basis of information input from the external detection device. For example, the recognizer 110 recognizes a state of an object present around it (for example, within a predetermined distance from the host vehicle M), such as a position, a speed, and an acceleration. For example, an object is a different vehicle, a bicycle, a pedestrian, or the like. For example, the position of an object is recognized as a position on absolute coordinates with an origin at a representative point (centroid, drive shaft center, or the like) in the host vehicle M and is used for control. The position of an object may be indicated by a representative point such as a centroid or a corner of the object or may be indicated as a region. A "state" of an object may include an acceleration or a jerk of the object or "an action state" (for example, whether or not it is making a lane change or attempting a lane change). The recognizer 110 recognizes the relative position and the relative speed with respect to an object.

For example, the recognizer 110 recognizes a lane in which the host vehicle M is traveling (traveling lane). For example, the recognizer 110 recognizes the traveling lane by comparing patterns (for example, arrays of solid lines and dotted lines) of road division lines obtained from the second map information 62 and patterns of road division lines around the host vehicle M recognized from images captured by the camera 10. The recognizer 110 may recognize the traveling lane by recognizing traveling path boundaries (road boundaries) including road division lines, road shoulders, curbstones, median strips, guardrails, and the like without being limited to road division lines. In this recognition, a position of the host vehicle M acquired from the navigation device 50 or processing results of the INS may be added. The recognizer 110 recognizes obstacles, stop lines, red lights, toll gates, and other road events from the recognition results of an object. Obstacles are objects with which the host vehicle M needs to avoid contact, and they include, for example, different vehicles and the like.

When recognizing the traveling lane, the recognizer 110 recognizes a position or a posture of the host vehicle M with respect to the traveling lane. For example, the recognizer 110 may recognize a deviation of a reference point in the host vehicle M from the center of the lane and an angle formed with respect to a line of the centers of the lane of the host vehicle M in the proceeding direction as a relative position and a posture of the host vehicle M with respect to the traveling lane. Instead of this, the recognizer 110 may recognize a position or the like of a reference point in the host vehicle M with respect to any side end part (road division line or road boundary) of the traveling lane as a relative position of the host vehicle M with respect to the traveling lane.

The driving state detector 120 detects a predetermined driving state of the driver of the host vehicle M. For example, a predetermined driving state is a distracted driving state. For example, distracted driving is a state in which the driving operation of the host vehicle M becomes slow (or it does not operate) due to decrease in driver's attentiveness or the like. For example, based on detection results of the SW sensor 82A, the driving state detector 120 detects that the driver is in a distracted driving state when a state in which a steering operation of the steering wheel 82 by the driver is smaller than a threshold continues for a predetermined time or longer. Based on detection results of the AP sensor 84A and the BP sensor 86A, the driving state detector 120 may detect that the driver is in a distracted driving state when a state in which the amount of change in opening degree of the accelerator pedal 84 and the brake pedal 86 is smaller than a threshold continues for a predetermined time or longer. For example, the predetermined time described above may be variably set depending on the speed of the host vehicle M, a margin degree until the host vehicle M comes into contact with an obstacle (for example, a different vehicle), or the like. Accordingly, more appropriate distracted driving can be judged on the basis of the speed of the host vehicle M, and the positional relationship between the host vehicle M and an obstacle. The predetermined time may be a fixed time.

When it is judged that the state of the driver detected on the basis of analysis results of images captured by the driver monitoring camera 70 is not a state appropriate for driving, the driving state detector 120 may detect that the driver is in a distracted driving state. For example, a case of being not a state appropriate for driving is a case in which the driver is not monitoring the surroundings (particularly the front) of the host vehicle M by looking away or the like, a case in which it is predicted that driver's concentration has decreased based on facial expression (drowsy face, painful face) or the like, or the like. Moreover, in addition to (or instead of) the state in which the driver is distracted, when a state in which the driver is unconscious (does not move for a predetermined time or longer) or the like is detected on the basis of analysis results of images captured by the driver monitoring camera 70, the driving state detector 120 may detect that the driver is in a state of being incapable of driving.

The driving state detector 120 may detect details of a driving operation by the driver of the host vehicle M (hereinafter, a driver's operation). For example, the driving state detector 120 may detect the amount of steering (torque amount of steering torque) of the driver based on detection results of the SW sensor 82A, may detect an operation (opening degree) of the accelerator pedal 84 based on detection results of the AP sensor 84A, or may detect an operation (opening degree) of the brake pedal 86 based on the BP sensor 86A.

The contact probability judger 130 recognizes whether or not there is a probability of contact between an obstacle (for example, a different vehicle) and the host vehicle M on the basis of the surrounding situation (external information) recognized by the recognizer 110. For example, the contact probability judger 130 judges whether or not there is a probability of contact between the host vehicle M and a different vehicle on the basis of a contact margin value with respect to a different vehicle (preceding vehicle) present in front of the host vehicle M on the basis of the surrounding situation. A contact margin value is an index value indicating a margin degree and is a value set on the basis of a contact margin time TTC (time to collision), for example, but it may be a value set on the basis of an inter-vehicle time THW (time headway). For example, in the relationship between the host vehicle M and a different vehicle, the contact margin time TTC is derived by dividing the relative distance by the relative speed. For example, the inter-vehicle time THW is derived by dividing the relative distance (inter-vehicle distance) by the speed of the host vehicle M. For example, the contact margin time TTC may be derived using a learned model in which the contact margin time TTC is output when the positions and the speeds of the host vehicle M and a different vehicle are input, a predetermined function, or the like, or it may be derived using a correspondence table in which the relative speed and the relative position are associated with the contact margin time TTC. Similarly, the foregoing derivation method also applies to the inter-vehicle time THW. For example, the shorter the contact margin time TTC (or the inter-vehicle time THW), the smaller the margin degree (in other words, the longer the contact margin time, the larger the margin degree). For example, the contact probability judger 130 judges that there is a probability of contact between the host vehicle M and a different vehicle when the contact margin value is smaller than a threshold, and it judges that there is no probability of contact when the contact margin value is equal to or larger than the threshold.

The controller 140 executes driving control for controlling one or both steering and acceleration/deceleration of the host vehicle M on the basis of at least one of recognition results of the recognizer 110, detection results of the driving state detector 120, and judgment results of the contact probability judger 130. For example, on the basis of recognition results of the recognizer 110, driving control suitable for an obstacle is executed when an obstacle is present in front of the host vehicle M and the driver is in a distracted driving state. For example, driving control suitable for an obstacle includes driving control for calling attention of the driver to an obstacle, driving control for avoiding contact with an obstacle, and the like.

For example, the controller 140 includes a braking controller 142 and a steering controller 144. When it is judged that an obstacle is present in front of the host vehicle M on the basis of recognition results of the recognizer 110, the braking controller 142 performs at least deceleration control of the host vehicle M on the basis of a target deceleration rate of the host vehicle M. The braking controller 142 performs braking control of the host vehicle M in accordance with a driver's operation or regardless of a driver's operation. For example, the braking controller 142 sets a deceleration state on the basis of the contact margin value between the host vehicle M and an obstacle and executes the deceleration control based on the set deceleration state. For example, the braking controller 142 includes a slow deceleration controller 142A and a contact avoidance braking controller 142B.

When the recognizer 110 judges that an obstacle (for example, a different vehicle) is present in front of the host vehicle M, the slow deceleration controller 142A performs slow deceleration control of the host vehicle M. The slow deceleration control is attention calling control for calling attention of the driver to approach to a different vehicle based on the vehicle behavior such as deceleration, and it is control different from contact avoidance braking control for avoiding contact with an obstacle through braking (however, there may be a case in which contact with an obstacle is avoided consequently). For example, when it is judged that an obstacle is present in front of the host vehicle M, and when the contact margin value satisfies operation conditions for the slow deceleration control, the slow deceleration controller 142A derives the target deceleration rate of the host vehicle M and decelerates the host vehicle M without depending on a driver's operation so as to reach the derived target deceleration rate. For example, the slow deceleration control is executed when the driving state detector 120 detects that the driver is performing distracted driving and may not be executed when distracted driving is not performed.

When the driving state detector 120 detects a driver's accelerator operation (operation of the accelerator pedal 84) equal to or larger than a predetermined value (for example, a predetermined amount) during the slow deceleration control, the slow deceleration controller 142A may suspend the slow deceleration control. In this manner, it is possible to execute more appropriate override (switching to manual driving of the driver) control with respect to the slow deceleration control by judging the driver's intention through an accelerator operation.

The contact avoidance braking controller 142B performs emergency brake control for avoiding contact between the host vehicle M and an obstacle. For example, when it is judged that there is a probability of contact of the host vehicle M with an obstacle based on the surrounding situation recognized by the recognizer 110, the contact avoidance braking controller 142B performs braking control for avoiding contact (sudden deceleration control). The braking control executed by the contact avoidance braking controller 142B includes, for example, collision mitigation brake system (CMBS) control for supporting contact avoidance or damage reduction. For example, the braking control executed by the contact avoidance braking controller 142B may be executed after the slow deceleration control or may be executed when the contact margin value satisfies operation conditions for the contact avoidance braking control.

For example, when the driving state detector 120 detects a driver's accelerator operation equal to or larger than a predetermined value (for example, a predetermined amount) during contact avoidance control, the contact avoidance braking controller 142B may execute the override control for suspending the contact avoidance control.

The steering controller 144 controls steering of the host vehicle M. For example, the steering controller 144 includes a centering steering controller 144A and a contact avoidance steering controller 144B. When the recognizer 110 judges that an obstacle is present in front of the host vehicle M, and when the contact margin value satisfies operation conditions for steering control, the centering steering controller 144A executes the steering control for moving the host vehicle M toward the center of the traveling lane (centering steering control). This steering control is not intended to avoid contact with an obstacle but is control for calling attention by making the driver be aware of an obstacle in front based on the vehicle behavior of laterally moving to a part near the center (however, there may be a case in which contact with an obstacle is avoided consequently). This steering control makes it possible for the driver to be aware of an obstacle in front at an early stage and can contribute to driving for avoiding contact. The centering steering control is executed when the driving state detector 120 detects that the driver is performing distracted driving and may not be executed when distracted driving is not performed. The slow deceleration control and the centering steering control described above may be separately executed or may be simultaneously executed at the same timing (for example, at the stage of the attention calling control).

For example, when the driving state detector 120 detects a driver's steering operation (operation of the steering wheel 82) equal to or larger than a predetermined value (for example, a predetermined amount) during the centering steering control, the centering steering controller 144A may execute the override control for suspending the centering steering control.

The contact avoidance steering controller 144B performs second steering control of the host vehicle M for avoiding contact between the host vehicle M and an obstacle. For example, when avoidance is possible within the traveling lane of the host vehicle M, the contact avoidance steering controller 144B performs the steering control for moving in a direction in which the host vehicle M does not come into contact with an obstacle within a range not departing from the same lane without depending on a driver's steering operation. The contact avoidance steering controller 144B may perform the steering control of the host vehicle M such that the behavior of the host vehicle M after an avoidance operation is made stable after the host vehicle M has performed an operation of avoiding an obstacle by straddling a division line dividing the traveling lane through a driver's steering operation. For example, the steering control executed by the contact avoidance steering controller 144B may be executed after the centering steering control or may be executed when the contact margin value satisfies operation conditions for contact avoidance steering control.

For example, when the driving state detector 120 detects a driver's steering operation equal to or larger than a predetermined value (for example, a predetermined amount) during the contact avoidance steering control, the contact avoidance steering controller 144B may execute the override control for suspending the contact avoidance steering control.

The controller 140 may execute control other than the driving control described above. For example, the controller 140 performs road departure curbing control, driver abnormality stopping control, and the like. For example, the road departure curbing control is control for notifying the driver and calling attention by applying vibration to the steering wheel 82, causing the display 32 to display an alarm image, or the like when there is a probability of departure from the division line dividing the traveling lane of the host vehicle M recognized by the recognizer 110. For example, the driver abnormality stopping control is control for moving the host vehicle M to a predetermined position (for example, a safe position such as a nearby road shoulder) and stopping it on the basis of recognition results of the recognizer 110 or the like when the driving state detector 120 detects that the driver is in a state of being incapable of driving. For example, the road departure curbing control and the driver abnormality stopping control may be executed when it has been detected that the driver is in a distracted state. The controller 140 may execute lane keeping assistance system (LKAS) control. For example, in the LKAS control, on the basis of recognition results of the recognizer 110, a driver's steering operation is supported by controlling the steering device 220 such that the host vehicle M does not depart from the traveling lane.

The HMI controller 150 outputs predetermined information to the HMI 30 so that an occupant including a driver is provided with (notified of) the information. For example, the predetermined information includes information related to traveling of the host vehicle M, such as information related to the state of the host vehicle M and information related to driving control. For example, the information related to the state of the host vehicle M includes a speed of the host vehicle M, a rotation frequency of the engine, a shift position, and the like. For example, the information related to driving control includes the kind of driving control being executed (for example, slow deceleration, centering steering control, contact avoidance braking control, contact avoidance steering control), the reason for the operation of driving control, the situation of driving control, and the like. The information related to driving control may include information related to attention calling or an alarm with respect to the driver (for example, a first notification, a second notification, and the like, which will be described below). The predetermined information may include information and the like related to a current position, a destination, and a remaining amount of fuel of the host vehicle M, and it may include information which is not related to traveling control of the host vehicle M, such as TV programs and contents (for example, movies) stored in a storage medium such as a DVD.

For example, the HMI controller 150 may generate images including the predetermined information described above and cause the display 32 of the HMI 30 to display the generated images or may generate audio indicating predetermined information and output the generated audio from the speaker 34 of the HMI 30. For example, the timing of outputting audio is a timing when driving control is started or suspended, a timing when an image to be displayed is switched at the time of reception, a timing when the host vehicle M is in a predetermined state, or the like. The HMI controller 150 may output information received through the HMI 30 to the controller 140 and the like.

[Regarding Vehicle Control]

Next, details of vehicle control including driving control by the controller 140 and notification control by the HMI controller 150 will be described. FIG. 2 is an explanatory view of details of vehicle control related to contact avoidance. In the example in FIG. 2, it is assumed that processing by the recognizer 110, the driving state detector 120, and the contact probability judger 130 is being continuously executed. In the example in FIG. 2, it is assumed that a time T1 is the earliest followed by times T2, T3, T4, and T5 in this order.

First, after the time T1 in FIG. 2, it is assumed that the contact probability judger 130 has judged that there is a probability of contact between the host vehicle M and an obstacle. When it is judged that there is a probability of contact, the controller 140 performs the attention calling control ((1) in the diagram) for calling attention of the driver to the surroundings (particularly in the proceeding direction) on the basis of the contact margin time TTC and detection results of the driving state detector 120. This attention calling control is an example of "first driving control".

FIG. 3 is an explanatory view of details of attention calling control. The example in FIG. 3 shows two lanes L1 and L2 allowing proceeding in the same direction (X axis direction in the diagram). The lane L1 is divided by road division lines LN1 and LN2, and the lane L2 is divided by road division lines LN2 and LN3. In the example in FIG. 3, it is assumed that the host vehicle M travels on the lane L1 at a speed VM and a different vehicle (preceding vehicle) m1 is traveling in front of the host vehicle M on the lane L1 at a speed Vm1. In the following description, it is assumed that the different vehicle m1 is an obstacle.

In the example in FIG. 3, the controller 140 performs the attention calling control when the contact margin time TTC (contact margin value) based on the relative position and the relative speed between the host vehicle M and the different vehicle m1 becomes the time T2 which is shorter than a first predetermined value (first predetermined time) and when it has been detected that the driver is performing distracted driving. For example, the time T2 is set to a value such that the contact margin time TTC is in between approximately 3 to 4 [sec], but it may be variably set on the basis of the relative speed, the relative position, the road shape, or the like.

The attention calling control includes at least one of the slow deceleration control by the slow deceleration controller 142A and the centering steering control by the centering steering controller 144A. In the example in FIG. 3, both the slow deceleration control and the centering control are executed. The slow deceleration control executed in the attention calling control is control in a first deceleration state. The slow deceleration controller 142A sets a target deceleration rate (first target deceleration rate) such that a load (longitudinal G) of a first upper limit deceleration rate (approximately 0.1 [G]) is applied to the driver in the proceeding direction (vertical direction). In the attention calling control (first deceleration state), the slow deceleration controller 142A may first perform the slow deceleration control at a first deceleration degree (for example, a longitudinal G of 0.05 [G]) and then may perform the deceleration control at a second deceleration degree (for example, a longitudinal G of 0.1 [G]) larger than the first deceleration degree. By performing control such that the deceleration degree increases in stages in this manner, it is possible to reduce a load on the driver at the time of starting execution of the slow deceleration control and curb a situation in which the driver is surprised due to the slow deceleration control.

In the attention calling control, the centering steering controller 144A performs the centering steering control for steering the host vehicle M toward the center of the traveling lane (lane L1). In the centering steering control, due to change in behavior in the lateral direction of the host vehicle M (width direction of the traveling lane, Y axis direction in the diagram), a load in the lateral direction (lateral G) is applied to the driver. This lateral G makes it possible for the driver to be aware of an obstacle in front and can contribute to avoidance of contact with an obstacle. It is possible to curb immediate departure from the traveling lane due to a driver's steering operation after the centering steering control by moving the host vehicle M to the center of the lane. In the example in FIG. 3, the controller 140 generates a future target trajectory K1 for the host vehicle M corresponding to slow deceleration and the centering steering control and controls steering and the speed of the host vehicle M such that it travels along the target trajectory K1.

For example, the centering steering control may not be executed when at least one of the division lines LN1 and LN2 of the traveling lane (lane L1) is not recognized by the recognizer 110, when the host vehicle M is already traveling at the center of the lane L1, or when the different vehicle m1 is closer to the center of the lane L1 than the host vehicle M. In that case, only the slow deceleration control in the attention calling control is executed.

At the time of the attention calling control (at the time of the first driving control) at the time T2, the HMI controller 150 generates an image indicating execution of the attention calling control (slow deceleration, centering steering control) and/or an image for calling attention of the driver as the first notification and notifies the driver by causing the display 32 to display a generated image IM10. Details or the kind of the image IM10 is not limited to the example in FIG. 3. The HMI controller 150 may generate an image indicating information of the reason for the operation of the attention calling control (for example, "THERE IS A PROBABILITY OF CONTACT WITH THE VEHICLE IN FRONT" or the like) and cause the display 32 to display it. In this manner, it is possible to call attention by informing the driver of approach to an obstacle through the first notification, and the driver can be prompted to perform an avoidance operation at an early stage. Since the first notification is in a state in which the probability of contact between the host vehicle M and the different vehicle m1 is not high due to a certain degree of contact margin value, audio is not output. Accordingly, it is possible to issue an early notification of attention calling while reducing the driver's feeling of being bothered by an excessive notification to the driver.

Returning to FIG. 2, when the contact margin time TTC (contact margin value) becomes the time T3 which is shorter than a second predetermined value (second predetermined time) in a state in which the driver does not pay attention to the surroundings (or perform the override control) although the attention calling control described above has been performed, and when it has been detected that the driver is performing distracted driving, contact attention alarm control ((2) in the diagram) is performed. This contact attention alarm control is an example of "second driving control". For example, the time T3 is a time at which the contact margin time TTC becomes approximately 2 [sec]. Namely, the second predetermined time is a time shorter than the first predetermined time.

Figure 4:
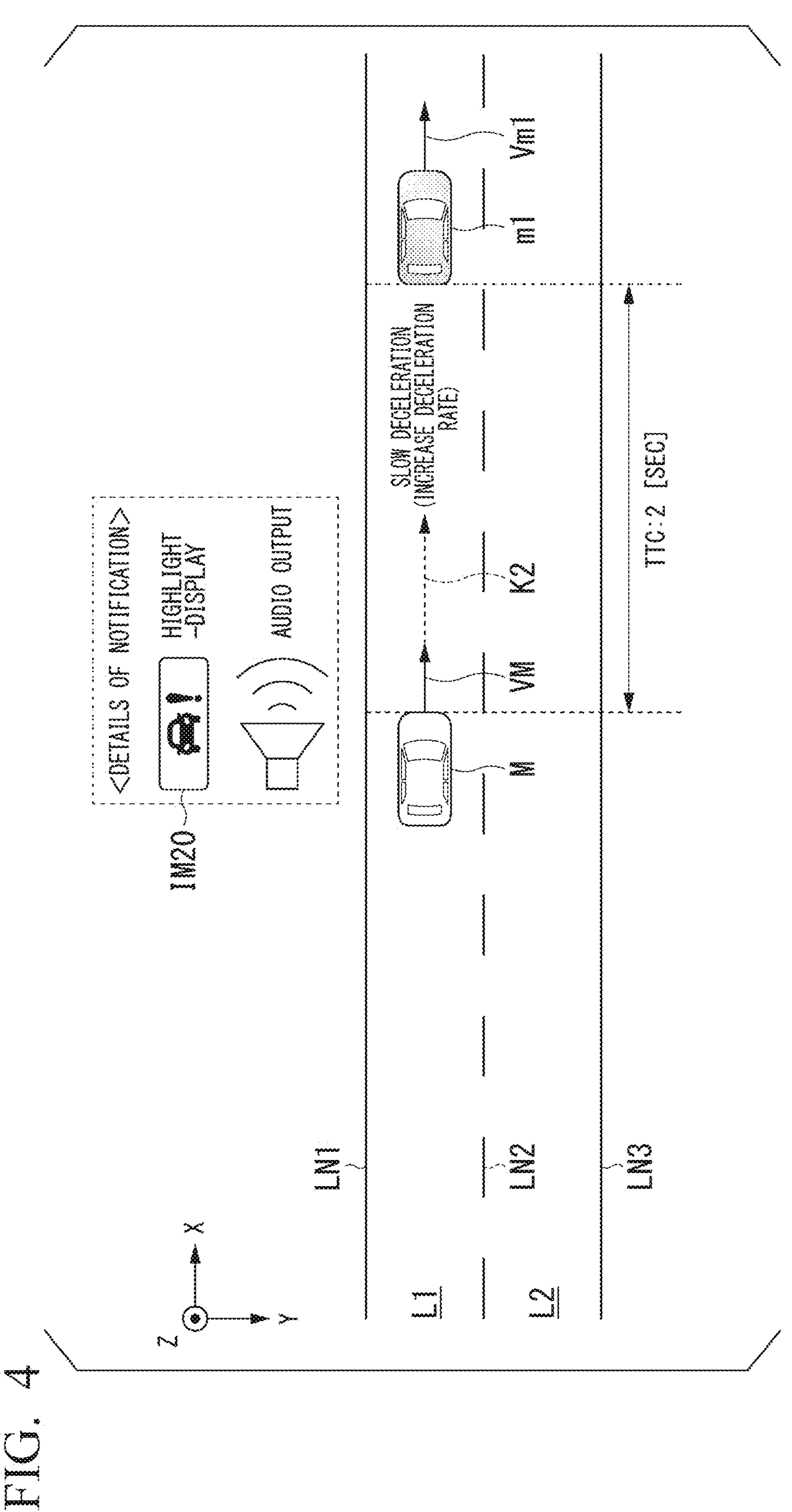
FIG. 4 is an explanatory view of details of contact attention alarm control.

FIG. 4 is an explanatory view of details of contact attention alarm control. FIG. 4 shows a scene in which the contact margin time TTC has become 2 [sec] in a situation with no driver's operation from the situation shown in FIG. 3 (a state in which the host vehicle M has approached further toward the different vehicle m1 from execution of the attention calling control). At the stage of the contact attention alarm control, the slow deceleration controller 142A sets a target deceleration rate (second target deceleration rate), generates a target trajectory K2 for executing the slow deceleration control corresponding to the set second target deceleration rate, and performs control such that the host vehicle M travels along the generated target trajectory K2. The slow deceleration control executed in the contact attention alarm control is control in a second deceleration state. In the second deceleration state, the slow deceleration controller 142A sets a target deceleration rate (second target deceleration rate) such that a load (longitudinal G) equal to smaller than a second upper limit deceleration rate (approximately 0.2 [G]) and larger than the first upper limit deceleration rate is applied to the driver in the proceeding direction (vertical direction). Accordingly, the driver can be more clearly aware of that the host vehicle M is approaching the different vehicle m1. In this manner, since the deceleration control is performed while increasing the deceleration rate as necessary, it is possible to create more time to be aware of the different vehicle m1, and the driver can perform driving while avoiding contact with the different vehicle m1 with plenty of time.

At the time of the contact attention alarm control, in addition to (or instead of) the slow deceleration control, the centering steering control may be executed by the centering steering controller 144A as described above. At the time of the contact attention alarm control (at the time of the second driving control) at the time T3, the HMI controller 150 generates an image indicating execution of the contact attention alarm control, an image for calling attention, an image indicating the reason for the operation of the contact attention alarm control, and the like for the driver as the second notification and notifies the driver by causing the display 32 to display a generated image IM20. The image IM20 may be a highlight-displayed image of the image IM10. For example, a highlighted image includes increasing the size of an image, blinking an image, changing the color of an image to a highlight color, switching from a still image to a video image (animation image), and the like. Highlight-displaying may include increasing the number of images to be displayed, displaying an image at a position more noticeable to the driver's eyes, and the like. In this case, the HMI controller 150 may cause the meter display to take over display from the MID or cause both the MID and the HUD to perform display. In addition to displaying an image, the HMI controller 150 may cause the speaker 34 to output predetermined sound (alarm). Namely, the second notification is a notification with a higher (escalated) notification level than the first notification. Accordingly, it is possible to more clearly notify the driver of a high probability of contact with the different vehicle m1 so that the driver can be prompted to perform contact avoidance.

Returning to FIG. 2, after the contact attention alarm control is executed, at the time T4 when it is judged that the host vehicle M can perform automatic avoidance within the traveling lane, the steering controller 144 executes automatic steering avoidance control ((3) shown in FIG. 2). The automatic steering avoidance control is an example of "third driving control".

Figure 5:
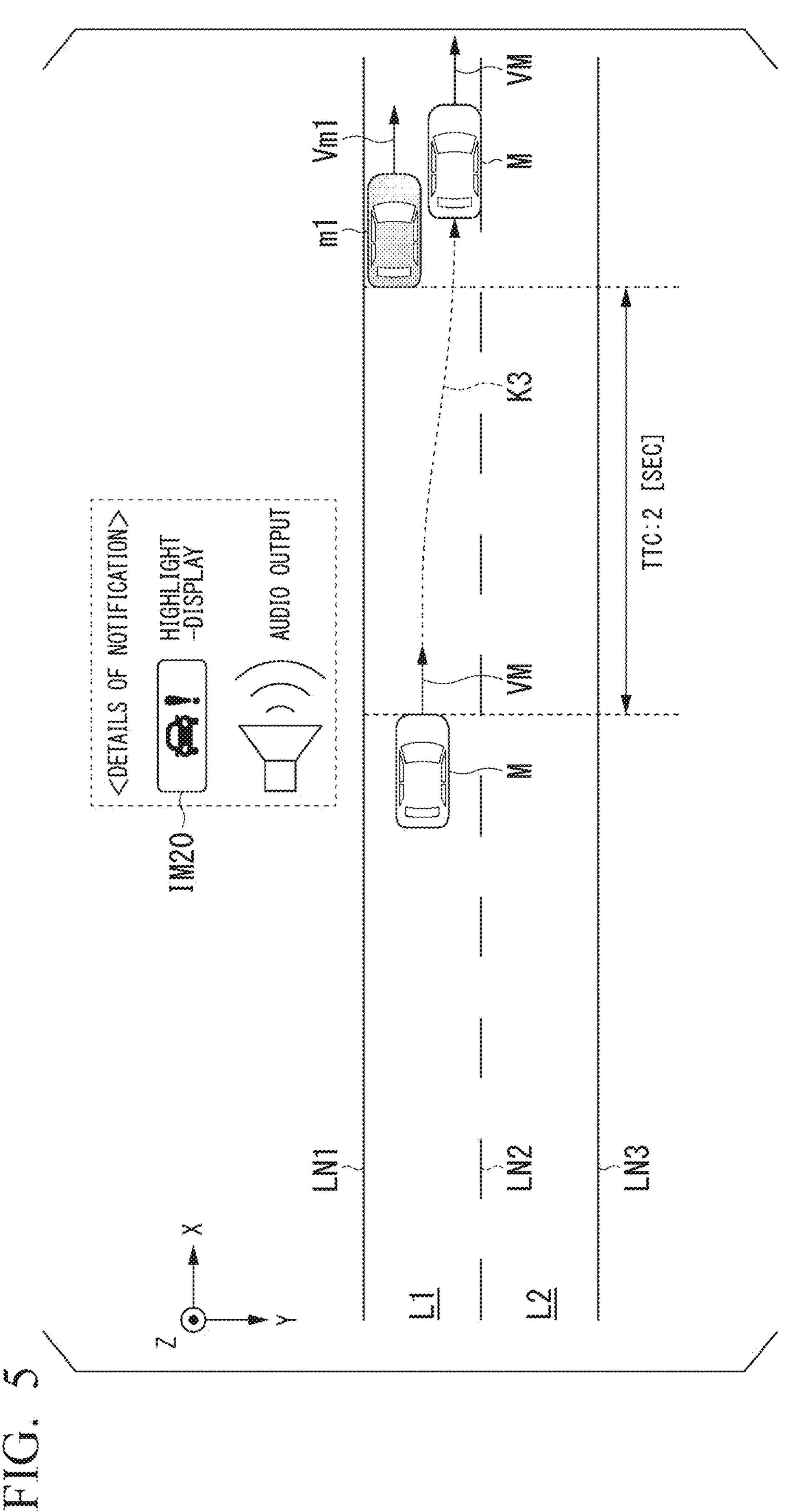
FIG. 5 is an explanatory view of details of automatic steering avoidance control.

FIG. 5 is an explanatory view of details of automatic steering avoidance control. For example, the example in FIG. 5 is control performed when a driving operation by the driver is not performed after the contact attention alarm control is executed. In this case, the contact avoidance steering controller 144B recognizes the region of the traveling lane and the position of the different vehicle m1 and performs the steering control for avoiding contact. For example, when a space for avoiding contact with the different vehicle m1 is present within the traveling lane, the contact avoidance steering controller 144B generates a target trajectory K3 for traveling in the avoidance space and executes the steering control (the speed control as necessary) such that the host vehicle M travels along the generated target trajectory K3. The contact avoidance steering controller 144B may execute acceleration/deceleration control in addition to the steering control. Accordingly, it is possible to realize more appropriate vehicle control by executing automatic steering control when steering avoidance can be performed within its own lane, which is highly safe.

At the time of the automatic steering avoidance control (third driving controller) at the time T4, the HMI controller 150 may continuously execute the second notification described above or may execute a notification with a higher notification level (third notification) than the second notification. At this timing, the contact avoidance braking controller 142B may execute the CMBS control in parallel. When the CMBS control is executed, the automatic steering avoidance control described above and the contact avoidance steering control which will be described below may not be executed.

Returning to FIG. 2, at the time T5 when the driver performs a steering operation in a direction in which the different vehicle m1 is avoided by operating the steering wheel 82 (by detecting a driver steering trigger), the contact avoidance steering controller 144B performs the contact avoidance steering control so as not to further depart from the adjacent lane (lane L2) adjacent to the traveling lane (lane L1) ((4) in FIG. 2). The contact avoidance steering control is an example of "fourth driving control". The contact avoidance steering control may be executed after the automatic steering avoidance control or may be executed after the contact attention alarm control.

Figure 6:
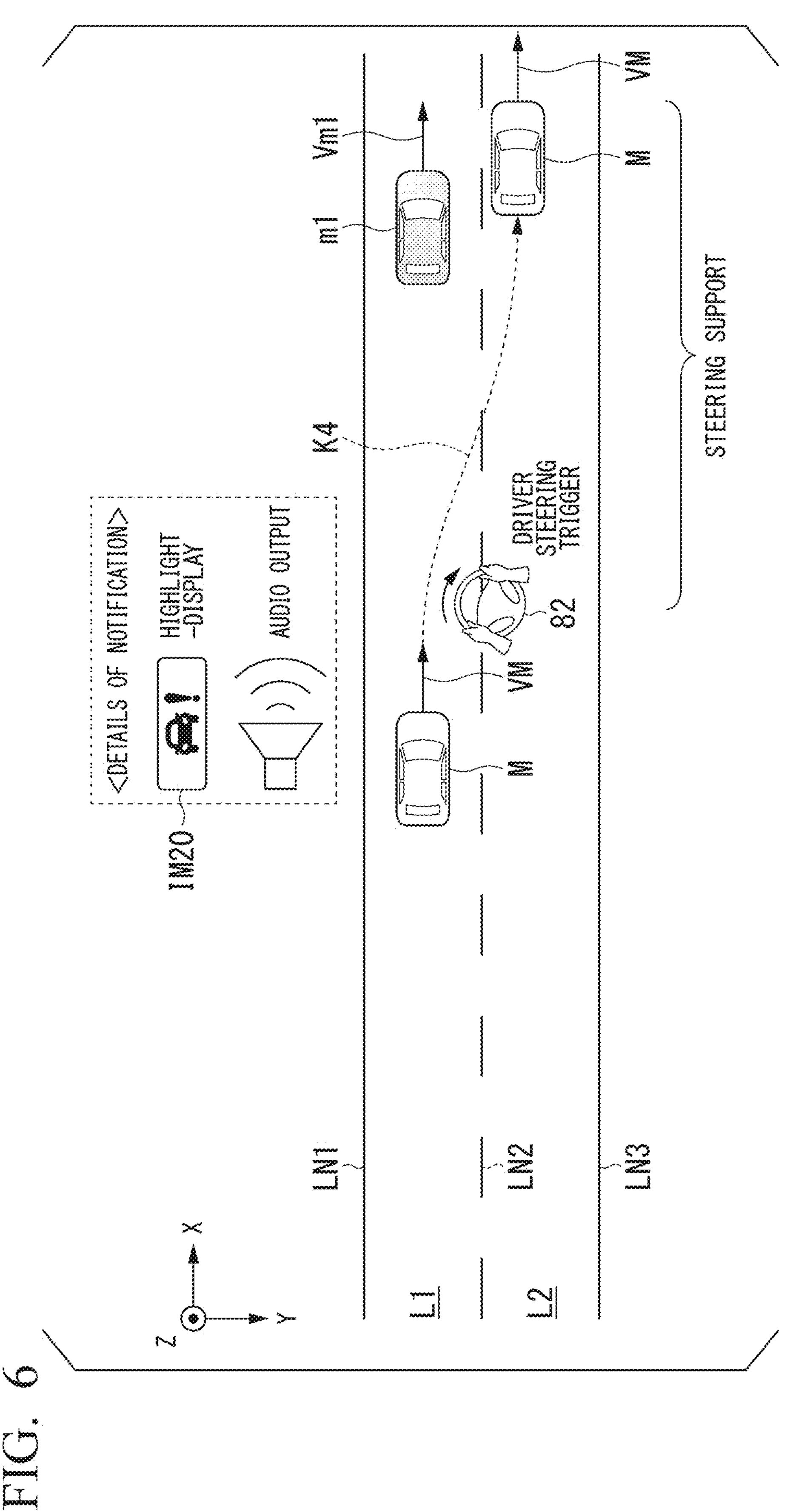
FIG. 6 is an explanatory view of steering control after a driver steering trigger.

FIG. 6 is an explanatory view of steering control after a driver steering trigger. In the example in FIG. 6, when a space for the host vehicle M avoiding contact with the different vehicle m1 is not present on the lane L1, and when the driver steering trigger (an amount of steering of the steering wheel 82 by the driver equal to or larger than a threshold) is detected, the contact avoidance steering controller 144B allows the host vehicle M to move from the lane L1 to the adjacent lane L2 and performs the steering control of the host vehicle M so as not to further depart from the adjacent lane L2. For example, a target trajectory K4 for a lane change to the lane L2 is generated, and steering support is executed such that the position of the host vehicle M becomes close to the target trajectory K4 through a steering operation by the driver. Accordingly, it is possible to realize more appropriate vehicle control after emergency avoid steering has been performed through a driver's steering operation. At the time of the contact avoidance steering control (at the time of the fourth driving control), the HMI controller 150 may continuously execute the second notification described above or may execute a notification with a higher notification level (fourth notification) than the second notification. The fourth notification may be a different notification which can be distinguished from the third notification by the driver.

When the driver immediately performs a steering operation after the attention calling control (after the first driving control) shown in (1) in FIG. 2, or when the contact margin time TTC becomes close to a limit value in a state in which the driver is not performing distracted driving, similar to the control of (4) in FIG. 2, the controller 140 may execute the contact avoidance steering control (driver steering support control) so as not to further cross the adjacent lane ((5) in FIG. 2). In this case, the HMI controller 150 may execute the second notification or may execute a notification with a higher notification level (fourth notification) than the second notification.

In each operation phase of attention calling, contact attention alarm, automatic steering avoidance, contact avoidance steering described above, conditions related to the speed of the host vehicle M may be added to the conditions for operating each process of the control. FIG. 7 is an explanatory view of speed conditions of the host vehicle M for starting control for each operation phase. For example, regarding the contact avoidance steering control in the automatic steering avoidance or the contact avoidance steering (steering support), the speed VM of the host vehicle M being 40 [km/h] or higher is one of the conditions for starting operation. Since this control is performed after attention calling, if the contact margin time TTC is approximately 2 [sec], it is sufficient to perform contact avoidance by a driver's brake operation. Regarding the centering steering control in attention calling and contact attention alarm, control is performed such that it is executed when the speed VM of the host vehicle M is 30 [km/h] or higher. Regarding the slow deceleration control in attention calling and contact attention alarm, when there is an accelerator operation (AP operation), control is performed such that it is executed when the speed VM of the host vehicle M is 30 [km/h] or higher. Since this speed falls below a steering avoidance limit speed and is within a range allowing a performance margin for the CMBS control, it is possible to realize more appropriate driving control by setting these conditions. When there is no AP operation, control is performed such that it is executed when the speed VM of the host vehicle M is 5 [km/h] or higher. Namely, a lower speed is set when no driver's AP operation is detected than when an AP operation has been detected. Accordingly, by mitigating the conditions for starting the slow deceleration control in a situation with no AP operation, the slow deceleration control can be executed in diverse situations, including distracted driving in congestion, and contact between the host vehicle M and the different vehicle m1 can be avoided more safely.

[Notification Control]

Next, notification control performed by the HMI controller 150 with respect to various driving control described above will be specifically described. For example, the HMI controller 150 issues the first notification when the first driving control (attention calling control) is performed as described above and issues the second notification when the second driving control (contact attention warning control) is performed. The HMI controller 150 may issue the second notification when a particular driving support function is operated within a predetermined time after the attention calling control (after the first driving control). For example, the particular driving support function is the attention calling control (first driving control). In this case, the first driving control is first attention calling control, and the particular driving support function is second attention calling control.

Figure 8:
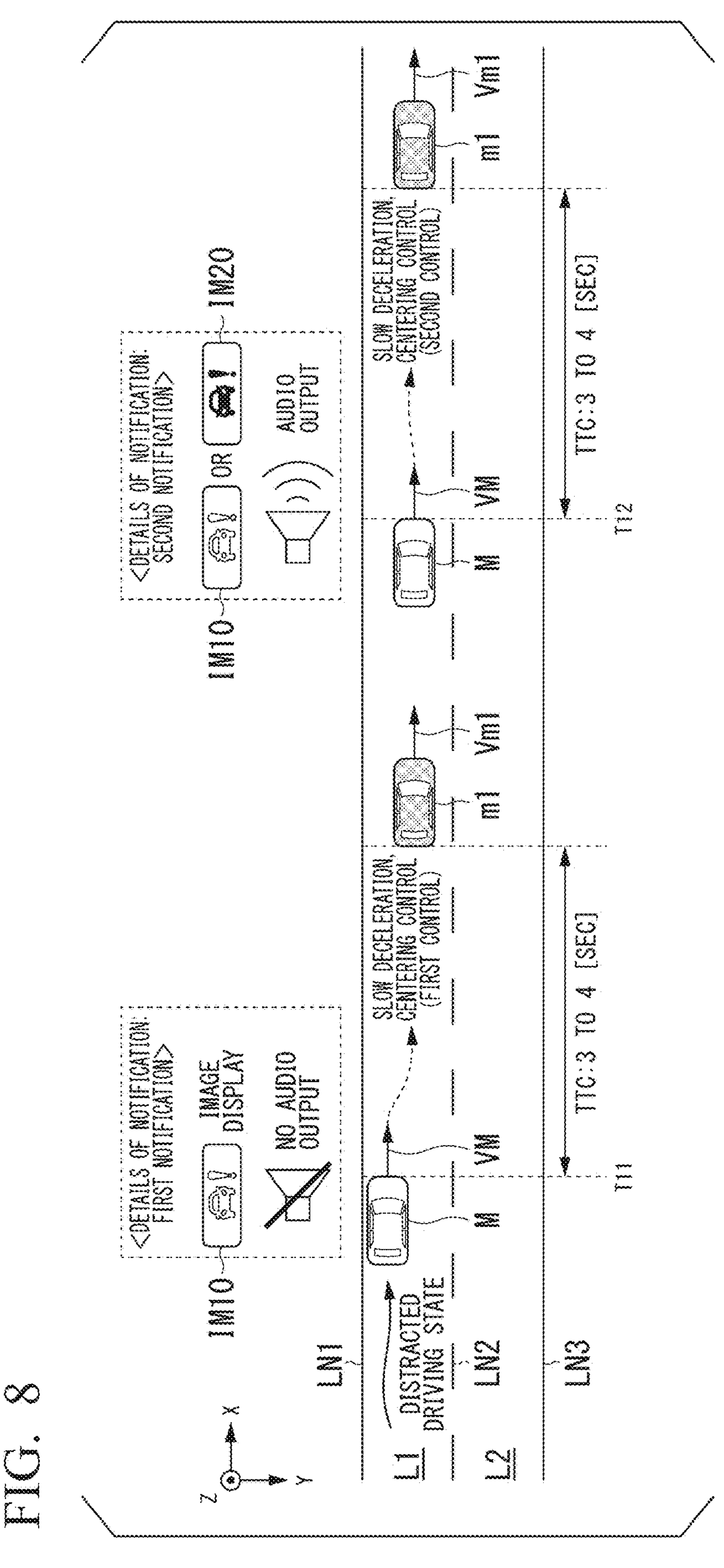
FIG. 8 is an explanatory view of details of notification control of the embodiment.

FIG. 8 is an explanatory view of details of notification control of the embodiment. In the example in FIG. 8, the host vehicle M is traveling in the lane L1 of the lanes L1 and L2 allowing proceeding in the same direction at the speed VM as described above, and the different vehicle m1 is traveling in front of the host vehicle M in the same lane at the speed Vm1. In the example in FIG. 8, it is assumed that a time T11 is a time earlier than a time T12.

For example, when the driver is in a distracted driving state and the contact margin time TTC is shorter than the first predetermined time, the slow deceleration control and the centering control are executed by the controller 140 as the first attention calling control, and the first notification is executed by the HMI controller 150. When the contact margin time TTC becomes much shorter than the first predetermined time at the time T12 within a processing time from the time (for example, the time T11) at which the attention calling control has been executed, the controller 140 executes the slow deceleration control and the centering control by causing the second attention calling control to operate. The predetermined time described above may be a fixed time (for example, approximately 180 [sec]) or may be a variable time suitable for the speed VM of the host vehicle M, the road situation, or the like. When the second attention calling control is operated within a predetermined time, the HMI controller 150 changes the notification level from the first notification to the second notification.

For example, as shown in FIG. 8, the HMI controller 150 causes the image IM10, which is the same as the first notification, to be displayed and outputs audio for calling attention (predetermined alarm sound) as the second notification. The HMI controller 150 may generate the image IM20 which is further highlight-displayed than the image IM10 and cause the display 32 to display it as the second notification. In this manner, only the image IM10 is displayed in the first attention calling control, and the notification level is raised by adding an audio output or the like when the attention calling control is operated twice within a predetermined time. Since it is clear that the driver is in a distracted driving state even at the time of execution of the second attention calling control, it is possible to more effectively call attention of the driver by raising the notification level.

In the embodiment, regarding the conditions for performing the notification control described above (the second notification in the second attention calling control within a predetermined time), the conditions may be that the attention calling control includes at least the steering control (in the example described above, the centering control). Namely, when only the slow deceleration control is performed without performing the centering control in the second attention calling control within a predetermined time, the HMI controller 150 may not raise the notification level. For example, when the recognizer 110 cannot locate the division lines of the traveling lane of the host vehicle M, the controller 140 does not execute the centering control and executes only the slow deceleration control. In such a case, even when operation conditions for the second attention calling control within a predetermined time are satisfied, the HMI controller 150 does not change the details of the notification and issues the first notification with respect to the slow deceleration control. In this manner, it is possible to curb a situation in which the notification control is operated more than necessary and reduce the driver's feeling of being bothered by limiting the target of driving control, of which the notification level is changed, to only the steering control. Since the situation of the host vehicle M after execution (the lateral position of the host vehicle M on the lane and the positional relationship between the host vehicle M and surrounding vehicles) changes more when the steering control is executed than when the deceleration control is executed, the driver can more quickly ascertain the changed situation of the vehicle by raising the notification level at the time of the second steering control.

The particular driving support function may be the road departure curbing control, for example, instead of (or in addition to) the attention calling control. Since the road departure curbing control is control executed when the driver is in a distracted driving state (control including the steering control), when the road departure curbing control is executed within a predetermined time from execution of the first driving control, it is possible to issue a more appropriate notification to the driver in a distracted driving state by switching from the first notification to the second notification.

The particular driving support function may be the driver abnormality stopping control instead of (or in addition to) the attention calling control or the road departure curbing control. Since the driver abnormality stopping control is control executed mainly when the driver is in a distracted state and further when the driver is in a state of being incapable of driving (control including the steering control), when the driver abnormality stopping control is executed within a predetermined time from execution of the first driving control, it is possible to issue a more appropriate notification to the driver by changing from the first notification to the second notification. In this manner, since the notification control can be performed in accordance with diverse patterns of distracted driving states, it is possible to issue a more appropriate notification toward the driver in accordance with the situation of the host vehicle M.

For example, when the override control is executed during the first driving control, the HMI controller 150 may not perform control for raising the notification level even when the particular driving support function is operated within a predetermined time from execution of the first driving control. Since the override control is executed by the driver performing a driving operation (a predetermined operation with respect to the driving operation piece 80), it can be seen that the driver is not in a distracted driving state. For this reason, the HMI controller 150 can reduce the probability that the driver will be bothered by the notification by not raising the notification level when the override control is executed.

In a driver's operation, when the override control is executed through a steering operation using the steering wheel 82, the HMI controller 150 may not change the notification level related to the second notification within a predetermined time regardless of the presence or absence of other driving operations (accelerator operation, brake operation). In the HMI controller 150, when the override control is executed through an accelerator operation or a brake operation, the fact that the steering wheel 82 is being gripped may be set as a condition for not changing the notification level. In this manner, it is possible to accurately detect that a distracted driving state has been resolved (has returned to normal manual driving) by detecting that the override control has been executed through a steering operation with respect to driving control. Even when the override control is performed through a driving operation related to the speed of the host vehicle M (accelerator operation, brake operation), it is possible to accurately detect that a distracted driving state has been resolved (has returned to normal manual driving) by adding the fact that the steering wheel 82 is being gripped to detection.

The controller 140 may control ON/OFF of driving control in accordance with control for changing the notification level by the HMI controller 150. For example, when the notification level is changed from the first notification to the second notification by the HMI controller 150, the controller 140 does not execute driving control based on the particular driving support function (for example, centering steering control). For example, since the notification level is raised through the second notification within a predetermined time, it is possible to curb excessive attention calling to the driver due to change in behavior of the host vehicle M in the centering control, slow deceleration, or the like.

When the notification level is changed in accordance with the second attention calling control within a predetermined time, the controller 140 may not execute successive attention calling control until a time set in advance has elapsed (control OFF). Since the notification level is raised through the second attention calling control and the driver is notified, the driver can be prompted to monitor the surroundings and perform appropriate driving by causing the driver to perform driving without executing successive attention calling control (third attention calling control and thereafter). It is possible to curb excessive dependence of the driver on driving control.

The notification control described above may also be similarly applied even when the particular driving support function is operated a plurality of times within a predetermined time. The HMI controller 150 may lengthen the notification time on the basis of the number of times of issuing the second notification within a predetermined time. In this case, the HMI controller 150 may lengthen the notification time in stages in accordance with the number of notifications or may lengthen it by a fixed time after the second attention calling control. The driver can be notified more effectively by lengthening the notification time.

[Processing Flow]

Next, processing executed by the driving support device 100 according to the embodiment will be described. Hereinafter, description will focus mainly on driving control processing of the processing executed by the driving support device 100 based on the situation of the host vehicle M and notification processing at the time of driving control.

Figure 9:
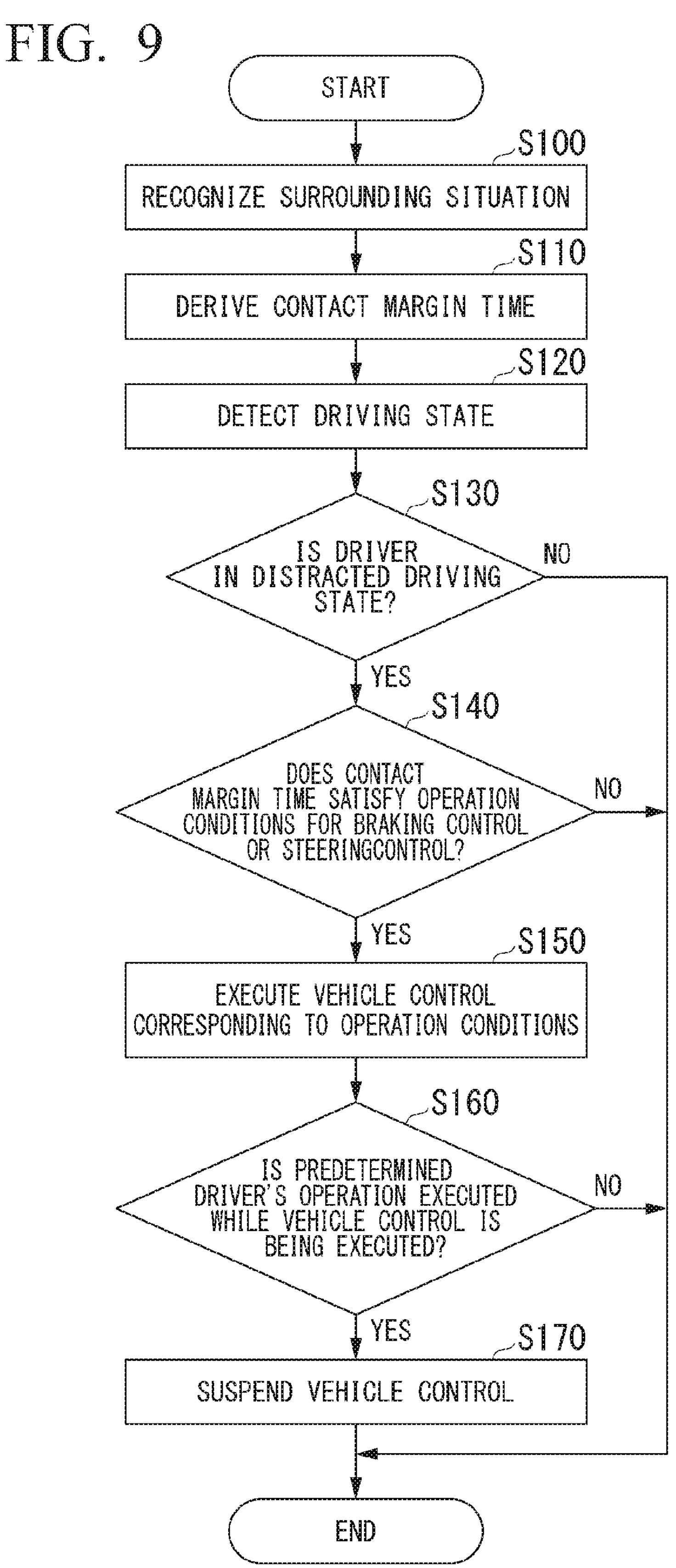
FIG. 9 is a flowchart showing an example of driving control executed by a driving support device.

FIG. 9 is a flowchart showing an example of driving control executed by the driving support device 100. In the example in FIG. 9, the recognizer 110 recognizes the surrounding situation of the host vehicle M (Step S100). Next, the contact probability judger 130 derives the contact margin time TTC between the host vehicle M and an obstacle on the basis of the recognized surrounding situation (Step S110). Next, the driving state detector 120 detects the driving state of the driver of the host vehicle M (Step S120) and judges whether or not the driver is in a distracted driving state (Step S130). When it is judged that the driver is in a distracted driving state, the controller 140 judges whether or not the contact margin time TTC satisfies operation conditions for the braking control or the steering control (Step S140). In the processing of Step S140, it may be judged whether or not the operation conditions for both the braking control and the steering control are satisfied. When it is judged that the contact margin time TTC satisfies the operation conditions for the braking control or the steering control, the controller 140 executes vehicle control corresponding to the operation conditions (Step S150). For example, this vehicle control includes at least one of the attention calling control, the contact attention alarm control, the automatic operation avoidance control, the driver steering support control, and the CMBS control described above. Moreover, the vehicle control may include the notification control.

Next, the controller 140 judges whether or not a predetermined driver's operation is executed while vehicle control is being executed (Step S160). When it is judged that the predetermined driver's operation is executed, the controller 140 suspends vehicle control being executed (Step S170). Accordingly, the processing of this flowchart ends. When it is judged that distracted driving is not performed in the processing of Step S130, when it is judged that the contact margin time TTC does not satisfy the operation conditions for the braking control or the steering control in the processing of Step S140, or when it is judged that the predetermined driver's operation is not executed while vehicle control is being executed in the processing of Step S160, the processing of this flowchart ends.

Figure 10:
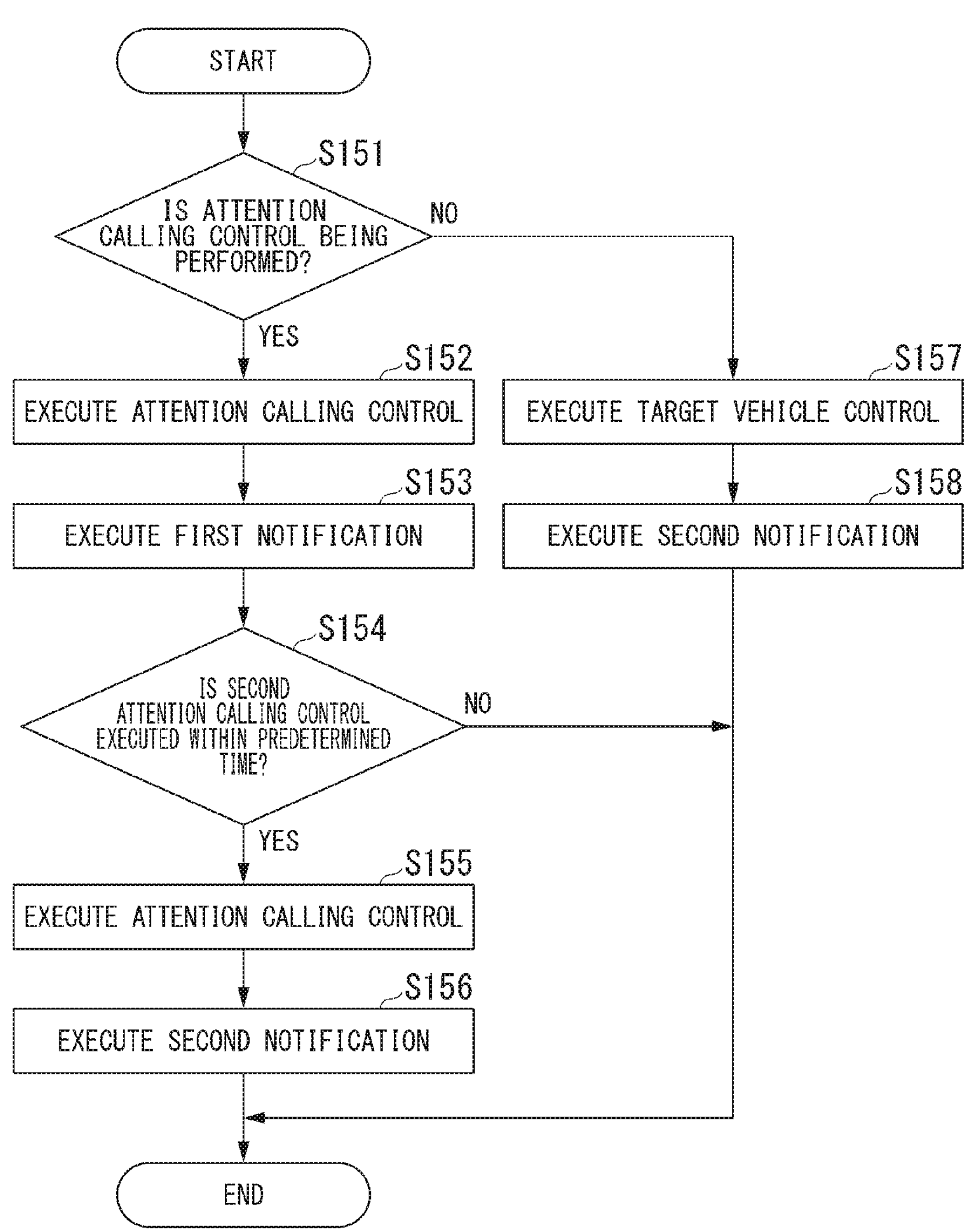
FIG. 10 is a flowchart showing an example of notification processing accompanying execution of vehicle control of the embodiment.

FIG. 10 is a flowchart showing an example of notification processing accompanying execution of vehicle control of the embodiment. The example in FIG. 10 shows an example of the processing of Step S150. In the example in FIG. 10, the controller 140 judges whether or not to perform the attention calling control (first driving control) (Step S151). When it is judged that the attention calling control is performed, the controller 140 executes the attention calling control (for example, slow deceleration control, centering control) (Step S152). Next, the HMI controller 150 issues the first notification (Step S153). Next, the HMI controller 150 judges whether or not to execute the second attention calling control (an example of the particular driving support function) within a predetermined time from the first attention calling control described above (Step S154). When it is judged that the second attention calling control is executed, the controller 140 executes the second attention calling control (Step S155). The HMI controller 150 executes the second notification with a higher notification level than the first notification (Step S156).

In the processing of Step S151, when it is judged that the control is not the attention calling control (in other words, any of the contact attention alarm control, the automatic steering avoidance control, and the contact avoidance steering control), the controller 140 executes the target vehicle control (Step S157). The HMI controller 150 executes the second notification (Step S158). Accordingly, the processing of this flowchart ends. In the processing of Step S154, when it is judged that the second attention calling control is not executed within a predetermined time, the processing of this flowchart ends.

As described above, according to the embodiment, the driving support device 100 (an example of the vehicle control device) includes the recognizer 110 that recognizes the surrounding situation of the host vehicle M; the driving state detector 120 that detects the driving state of the driver of the host vehicle M; the controller 140 that executes, when an obstacle is present in front of the host vehicle M and the driver is in a distracted driving state, driving control suitable for the obstacle on the basis of recognition results of the recognizer 110; and the notifier (HMI 30, HMI controller 150) that issues a notification to the driver when driving control is executed by the controller 140. The notifier includes the first notification which is notified at the time of execution of the first driving control including the steering control, and the second notification which is notified at the time of execution of the second driving control executed in a state in which the host vehicle has approached further toward the obstacle from in the first driving control. The second notification is issued when a particular driving support function is operated within a predetermined time from the first notification. Therefore, it is possible to issue a more appropriate notification to the driver in accordance with the situation of the vehicle.

Specifically, according to the embodiment, when the particular driving support function related to a distracted driving state is operated within a predetermined time after the first notification, since it is clear that the driver is distracted, by changing (raising) the notification level (notification strength), the driver can be notified of attention calling or the like more effectively. According to the embodiment, it is possible to more accurately judge that the driver is in a distracted driving state by targeting the second operation of the same function or operation of the related function (road departure curbing control, the driver abnormality stopping control, and the like). According to the embodiment, it is possible to curb a situation in which the notification level is raised more than necessary by targeting a part of driving control (for example, steering control), and it is possible to reduce a probability that the driver will be bothered. According to the embodiment, it is possible to reduce a probability that the driver will be bothered without increasing the notification strength more than necessary by judging that the driving state has returned to normal driving from a distracted driving state through the override control.

According to the embodiment, when it is clear that the driver is in a distracted driving state, the driver can confirm the surrounding situation more quickly and the driver can be prompted to perform safety driving by turning off the driving control until a certain times has elapsed after the notification level has been raised and a notification has been issued. According to the embodiment, when it is clear that the driver is in a distracted driving state, the driver can be notified more effectively by lengthening the notification time in accordance with the number of times of operation of the particular driving support function within a predetermined time.

The numerical values indicated in the embodiment described above are merely examples and may be suitably changed in accordance with the vehicle kind of the host vehicle M, the road situation, the surrounding situation, setting of the developer, or the like. In the embodiment described above, at least one of the third driving control and the fourth driving control may be included in the second driving control from the viewpoint of driving control other than the first driving control.

The embodiment described above can be expressed as follows.

A vehicle control device includes a storage medium which stores computer-readable instructions, and a processor which is connected to the storage medium. The processor executes the computer-readable instructions to: recognize a surrounding situation of a host vehicle; detect a driving state of a driver of the host vehicle; execute, when an obstacle is present in front of the host vehicle and the driver is in a distracted driving state, driving control suitable for the obstacle on the basis of recognition results of the surrounding situation; and issue a notification to the driver when the driving control is executed. The notification includes a first notification which is notified at the time of execution of first driving control including steering control, and a second notification which is notified at the time of execution of second driving control executed in a state in which the host vehicle has approached further toward the obstacle from in the first driving control. The second notification is issued when a particular driving support function is operated within a predetermined time from the first notification.

Hereinabove, forms for performing the present invention have been described using an embodiment. However, the present invention is not limited to such an embodiment in any way, and various modifications and replacements can be added thereto within a range not departing from the gist of the present invention.

While a preferred embodiment of the invention has been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:

a recognizer that recognizes a surrounding situation of a host vehicle;

a driving state detector that detects a driving state of a driver of the host vehicle;

a controller that executes, when an obstacle is present in front of the host vehicle and the driver is in a distracted driving state, driving control suitable for the obstacle on the basis of recognition results of the recognizer; and a notifier that issues a notification to the driver when the driving control is executed by the controller, wherein the notifier issues a first notification which is notified at a time of execution of a first driving control including steering control, and a second notification which is notified at a time of execution of a second driving control executed in a state in which the host vehicle has approached further toward the obstacle from in the first driving control, and the second notification is issued when a particular driving support function is operated within a predetermined time from the first notification.

2. The vehicle control device according to claim 1, wherein the first notification is a notification issued by displaying an image, and the second notification is a notification issued by displaying an image and outputting sound.

3. The vehicle control device according to claim 1, wherein the particular driving support function includes steering control for curbing road departure of the host vehicle.

4. The vehicle control device according to claim 1, wherein the particular driving support function includes control for stopping the host vehicle at a predetermined position when it is detected that the driver is not in a state of being capable of driving the host vehicle.

5. The vehicle control device according to claim 1, wherein the particular driving support function includes steering control for causing the driver, when it is judged that the obstacle is present in front of the host vehicle and it is judged that the driver is distracted, to recognize a presence of the obstacle from recognition results of the recognizer.

6. The vehicle control device according to claim 1, wherein the first driving control is first steering control for calling attention of the driver of the host vehicle to the obstacle, and the particular driving support function is second steering control for calling attention of the driver of the host vehicle to the obstacle.

7. The vehicle control device according to claim 1, wherein the controller does not perform the first driving control and performs deceleration control for decelerating the host vehicle when a traveling lane of the host vehicle has not been able to be recognized by the recognizer, and the notifier issues a notification for the deceleration control.

8. The vehicle control device according to claim 1, wherein the notifier does not issue the second notification even when the particular driving support function is operated within a predetermined time from the first driving control when override control for switching to manual driving through a predetermined driving operation of the driver is executed at a time of executing the first driving control.

9. The vehicle control device according to claim 8, wherein the predetermined driving operation of the driver is a steering operation of the host vehicle.

10. The vehicle control device according to claim 8, wherein the notifier does not issue the second notification even when the particular driving support function is operated within a predetermined time from the first driving control on condition that the driver is gripping a steering wheel when the override control is executed through an accelerator operation or a brake operation of the driver.

11. The vehicle control device according to claim 1, wherein the controller does not execute a driving control for calling attention of the driver of the host vehicle to the obstacle until a time set in advance elapses when the second notification is issued by the notifier within the predetermined time from the first notification.

12. The vehicle control device according to claim 1, wherein the notifier lengthens a notification time on the basis of a number of times of issuing the second notification within a predetermined time.

13. A vehicle control method in which a computer
recognizes a surrounding situation of a host vehicle,
detects a driving state of a driver of the host vehicle,
executes, when an obstacle is present in front of the host vehicle and the driver is in a distracted driving state, driving control suitable for the obstacle on the basis of recognition results of the surrounding situation, and
issues a notification to the driver when the driving control is executed,
wherein the notification includes a first notification which is notified at a time of execution of a first driving control including steering control, and a second notification which is notified at a time of execution of second driving control executed in a state in which the host vehicle has approached further toward the obstacle from in the first driving control, and
the second notification is issued when a particular driving support function is operated within a predetermined time from the first notification.

14. A computer readable non-transitory storage medium which stores a program causing a computer
to recognize a surrounding situation of a host vehicle,
to detect a driving state of a driver of the host vehicle,
to execute, when an obstacle is present in front of the host vehicle and the driver is in a distracted driving state, driving control suitable for the obstacle on the basis of recognition results of the surrounding situation, and
to issue a notification to the driver when the driving control is executed,
wherein the notification includes a first notification which is notified at a time of execution of a first driving control including steering control, and a second notification which is notified at a time of execution of second driving control executed in a state in which the host vehicle has approached further toward the obstacle from in the first driving control, and
the second notification is issued when a particular driving support function is operated within a predetermined time from the first notification.

* * * * *